J. A. EWING.
LEVEL.
APPLICATION FILED AUG. 22, 1914.

1,198,830.

Patented Sept. 19, 1916.

WITNESSES:
F. C. Fliedner
G. M. Ball

INVENTOR,
J. A. Ewing
BY Francis M. Wright,
ATTORNEY

UNITED STATES PATENT OFFICE.

JOSEPH A. EWING, OF LOS ANGELES, CALIFORNIA.

LEVEL.

1,198,830.  Specification of Letters Patent.  Patented Sept. 19, 1916.

Application filed August 22, 1914. Serial No. 858,027.

*To all whom it may concern:*

Be it known that I, JOSEPH A. EWING, a citizen of the United States, residing at Los Angeles, in the county of Los Angeles and State of California, have invented new and useful Improvements in Levels, of which the following is a specification.

The present invention relates to improvements in levels for use by carpenters and the like, the object of the invention being to provide a level which will be cheap, of light weight, simple in construction, convenient in use, which cannot be easily broken, and of which a person can read the indications when held as high as he can reach.

Figure 1:
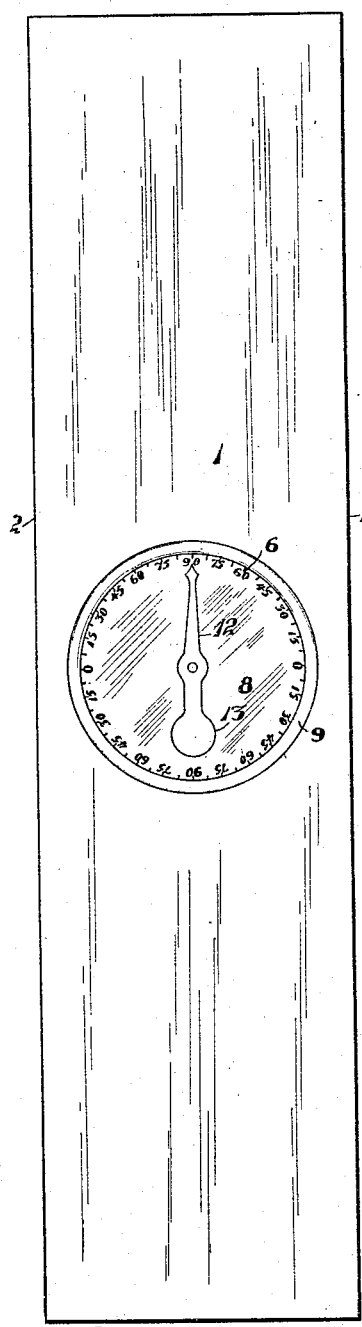
Figure 2:
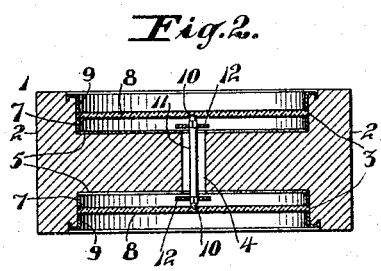

In the accompanying drawing, Figure 1 is a side view of the level; Fig. 2 is a cross sectional view.

Referring to the drawing, 1 indicates the body of the level, having two parallel straight edges or faces 2. In opposite sides of the central portion of the level there are formed two equal circular recesses 3 registering with each other, and through the portion of the body intervening between said recesses is a central hole 4. On the bottom of each recess is secured an indicating plate or dial 5, having thereon a scale 6 indicating angles. Said plates are also formed with central holes registering with the hole 4 in the intervening portion of the body. Fitting closely against the side of each recess is a metal ring 7, the inner edge of which abuts against said plate, and a circular glass plate 8 abuts against the outer edge of said ring. Abutting against the outer surface of each plate is a ring 9 fitting tightly within the recess. In the inner side of each glass plate is formed a small central socket or bearing 10, and in said bearings 10 are journaled the ends of a shaft 11, extending freely through the holes in the plates and intermediate portion of the body. On said shaft are secured on the outer sides of the plates pointers 12 having weighted ends 13. Thus said shaft, and the pointers secured thereon, can swing freely in said bearings 10, and the weighted ends of the pointers will always remain lowermost whatever be the inclination of the straight edges of the level. Since the pointers therefore always indicate a vertical line, they serve to indicate when the straight edges 2 are vertical, if the indicating plates are accurately placed in position. Hence by means of this construction of a small shaft journaled at its ends in small bearings or recesses in the inner surfaces of glass plates, passing freely through holes in the indicating plates, and carrying pointers movable over said plates, I provide a level of cheap and simple construction, which is readily visible at a considerable distance from the eye of the observer, which is convenient in use, and of light weight and which cannot easily be broken.

I claim:—

In a level, a body having a straight edge, opposite faces of the body having cylindrical recesses registering with each other, a circular indicating dial sheet on the bottom of each recess, an inner ring fitting closely against the side of each recess, and the inner edge of each of which abuts against the margin of the adjacent dial sheet, a circular glass plate fitting against the outer edge of each ring, an outer ring abutting against the outer surface of each plate and fitting tightly within the recess, the body having a communication between said recesses located centrally thereof, the dial sheets having central holes registering with said communication, a shaft passing through said holes and communication, the inner surfaces of the glass plates being provided with central sockets in which the ends of the shaft are journaled, and pointers having weighted ends and secured upon said shaft, each between a glass plate and the adjacent dial sheet.

In testimony whereof I have hereunto set my hand in the presence of two subscribing witnesses.

JOSEPH A. EWING.

Witnesses:
  W. BARNEY BACKLEY,
  LYMAN MAXWELL.

Copies of this patent may be obtained for five cents each, by addressing the "Commissioner of Patents, Washington, D. C."